F. LUNDGREN.
LUBRICATING AND COOLING DEVICE FOR INTERNAL COMBUSTION ENGINES.
APPLICATION FILED JAN. 20, 1919.
1,312,190. Patented Aug. 5, 1919.
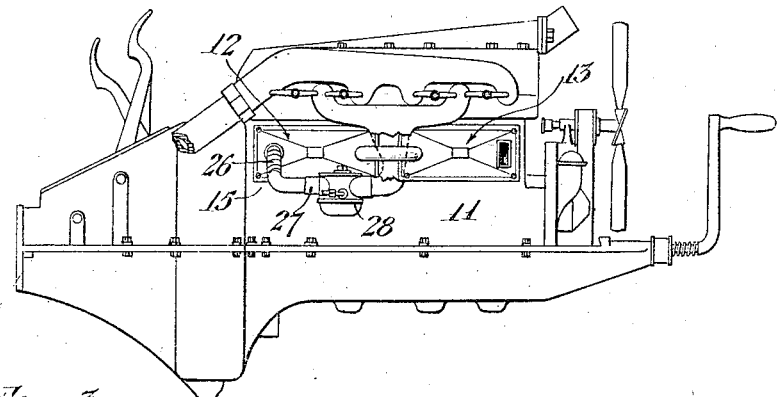
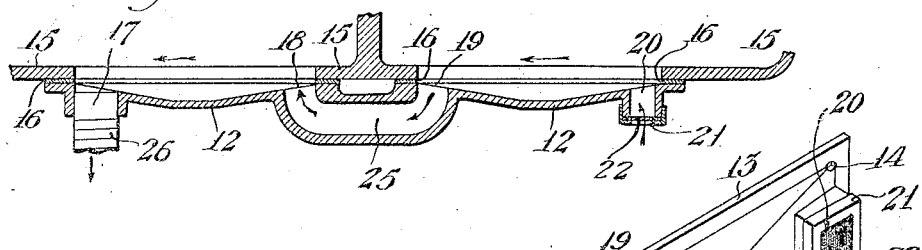
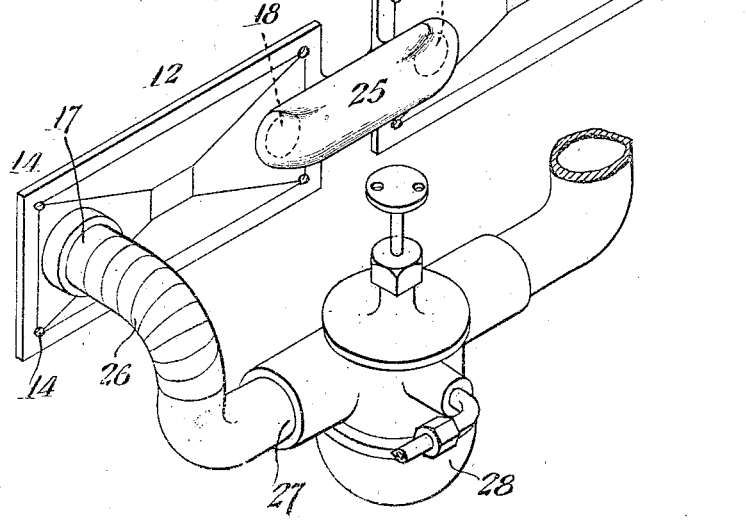

UNITED STATES PATENT OFFICE.

FRED LUNDGREN, OF LOS ANGELES, CALIFORNIA.

LUBRICATING AND COOLING DEVICE FOR INTERNAL-COMBUSTION ENGINES.

1,312,190.   Specification of Letters Patent.   Patented Aug. 5, 1919.

Application filed January 20, 1919. Serial No. 272,216.

*To all whom it may concern:*

Be it known that I, FRED LUNDGREN, a citizen of the United States, residing at Los Angeles, in the county of Los Angeles and State of California, have invented a new and useful Improvement in Lubricating and Cooling Devices for Internal-Combustion Engines, of which the following is a specification.

My invention relates to internal combustion engines, and the object of the invention is to provide a device which will assist in keeping the engine, and more particularly the parts of the engine subjected to lubrication, cool under all conditions of running.

A further advantage of the invention is that the same device lubricates the valves and pistons of the engine.

A still further advantage of the invention is that the heat of the engine is utilized to heat the air of combustion used in the engine.

Further objects and advantages will be made evident hereinafter.

Referring to the drawing, which is for illustrative purposes only,

Figure 1 is a side view of an engine equipped with my invention.

Fig. 2 is a perspective view of my invention as attached to a carbureter.

Fig. 3 is a cross-section taken on a horizontal plane passing approximately through the center of the invention.

In the form of my invention illustrated in these drawings, 11 is an internal combustion engine which in this case is of the type used in the Ford and other automobiles. In this type of engine the valve stems move inside two inclosed spaces commonly termed the valve stem chambers, these spaces being formed in the side of the automobile and being more or less filled with oil vapor produced by the splash lubrication of the engine, the oil being drained away from the chambers through openings in the bottom into the crank case. In the later types of engines these valve stem chambers are closed by suitable covers to prevent oil from escaping therefrom.

In applying my invention to these engines I provide two covers 12 and 13 which are provided with holes 14 through which bolts are passed bolting the covers to the frame 15 of the engine, this frame being shown in plan view and in section in Fig. 3. The covers 12 and 13 are provided with gaskets 16 so that they are in more or less air tight and oil tight relationship with the frame 15.

Each of the covers is provided with two openings which may be conveniently numbered 17, 18, 19 and 20. The opening 20 is covered by a cap 21 having a screened opening 22 therein, the object of this screen being to exclude dirt and dust from the interior of the engine. The openings 18 and 19 are connected by a pipe or channel 25 and the opening 17 is connected through a flexible pipe 26 with the air intake 27 of the carbureter 28 of the engine.

The method of operation of the engine is as follows:

Whenever the engine is started the air for combustion is taken through the flexible pipe 26 and the opening 17 from the valve stem chamber whose front is closed by the cover 12. This air is almost wholly drawn through the pipe 25 from the second valve stem chamber whose front is closed by the cover 13, this air entering the latter valve stem chamber through the opening 22. There is thus a continuous circulation of air in and around the valve stems and into the carbureter 28. This circulation of air accomplishes three results. In the first place, it tends to keep the engine cool and to cool the oil which is thrown up into the valve chambers and constantly drained therefrom. In the second place, it tends to lubricate the valves and pistons as the oil vapor which is present in the valve stem chambers is carried over with the air through the flexible pipe 26 into the carbureter 28. The oil and oil vapor thus carried over are delivered in and around the valves of the engine and into the cylinders thereof, condensing on the walls of the cylinders and being taken up by the pistons in their travel. In the third place, the air in passing through the valve stem chambers comes in contact with the heated parts of the engine and with the more or less heated oil of the engine and it is itself heated before being delivered in the cylinders, thus facilitating combustion.

Various advantages of my invention are well summed up in the name which I have given to it, namely, Lubricooler.

What I claim is:—

1. In combination with an internal combustion engine having two valve stem chambers, a cover for each chamber, each of said covers having two openings therein, a filtering medium in one of the openings of one of said covers, means connecting the other opening of said cover with one opening of the second cover, and means connecting the other opening of said second cover with the air intake of the carbureter of said engine.

2. In combination with an internal combustion engine having two independent chambers formed inside the engine and so placed as to receive oil or oil vapor from the crank case of said engine, a cover for each chamber, each of said covers having two openings therein, a filtering medium in one of the openings of one of said covers, means connecting the other opening of said cover with one opening of the second cover, and means connecting the other opening of said second cover with the air intake of the carbureter of said engine.

3. In combination with an internal combustion engine having two valve chambers, a cover for each chamber, each of said covers having two openings therein, means for connecting one opening of one cover with one opening of the second cover, and means connecting the other opening of said second cover with the air intake of the carbureter of said engine.

4. In combination with an internal combustion engine having two independent chambers formed inside the engine and so placed as to receive oil or oil vapor from the crank case of said engine, a cover for each chamber, each of said covers having two openings therein, means for connecting one opening of one cover with one opening of the second cover, and means connecting the other opening of said second cover with the air intake of the carbureter of said engine.

In testimony whereof, I have hereunto set my hand at Los Angeles, California, this 11th day of January, 1919.

FRED LUNDGREN.